United States Patent Office 3,316,263
Patented Apr. 25, 1967

3,316,263
2-(SUBSTITUTED PHENYLTHIO)-4,6-DIALKOXY-1,3,5-TRIAZINES
Frank Ross, Villa Park, and Sidney B. Richter, Chicago, Ill., assignors to Velsicol Chemical Corporation, Chicago, Ill., a corporation of Illinois
No Drawing. Filed Nov. 2, 1964, Ser. No. 408,383
12 Claims. (Cl. 260—248)

This application is a continuation-in-part of our copending application Ser. No. 223,524, filed Sept. 13, 1962, now abandoned.

This invention relates to new pesticidal compositions of matter. More particularly, this invention relates to compounds having the structural formula

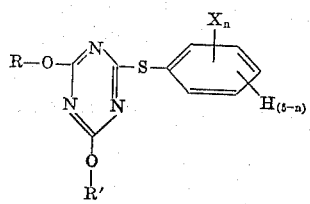

wherein R and R' are independently selected from the group consisting of alkyl radicals of 1 to 4 carbon atoms; $n$ is a number from 1 to 5; and each X is independently selected from the group consisting of chlorine, bromine, nitro, amino, and alkyl, alkoxy, alkylthio and alkylamido radicals of 1 to 4 carbon atoms, provided that when $n$ is a minimum of 3, a maximum of two X's are selected from the group consisting of nitro, amino, and alkyl, alkoxy, alkylthio and alkylamido radicals of 1–4 carbon atoms.

These chemical compounds have marked activity as insecticides useful for the control of undesirable insect pests.

Generally, the new compounds described above, can be prepared, for example, by replacing the halogen atoms of the corresponding cyanuric halide with the desired substituents. Cyanuric halides which are suitable as the starting material for the preparation of the compounds of this invention, are cyanuric chloride and cyanuric bromide.

As one example of the preparation of the compounds of this invention, the cyanuric halide is reacted with a suitable alcohol to form the intermediate, 2-alkoxy-4,6-dihalo-1,3,5-triazine. Suitable alkanol reactants useful in the formation of the intermediate of the compounds of this invention, are the alcohols having 1 to 4 carbon atoms. The alkoxy residue of the alcohol selected will appear as the alkoxy substituent. Thus, for example, if the desired compound of this invention is to have methoxy substituents in the 2-position, methyl alcohol is selected as the alkanol reactant. Similarly, to obtain the ethoxy-, n-propoxy, iso-propoxy, n-butoxy, iso-butoxy, sec-butoxy, or tert-butoxy substituent in the 2-position, ethyl alcohol, n-propyl alcohol, iso-propyl alcohol, n-butyl alcohol, iso-butyl alcohol, sec-butyl alcohol, and tert-butyl alcohol, respectively, is utilized as the alkanol reactant.

The alkoxy substituted triazine intermediate of the compounds of the present invention can be prepared by reacting cyanuric chloride or cyanuric bromide with an equimolecular or greater quantity of the alkanol reactant for each halogen atom to be replaced, in the presence of a weak base, such as sodium bicarbonate, 2,4,6-trimethylpyridine, and the like. This reaction can be conveniently effected at normal room temperature for a period of about one-half hour, so as to replace only one halogen atom of the cyanuric halide; or the reaction can be performed at higher temperatures, such as up to about 100° C., to replace two halogen atoms as where R and R' are to be identical. Where R and R' are to be non-identical, the reaction is first performed with one alcohol of the formula ROH, at a low temperature such as those heretofore described, the product separated from excess alcohol, and the reaction performed again at the higher temperatures described above with the second alcohol R'OH having the desired R' substituent. The cyanuric halide is preferably dissolved in an excess of the alkanol reactant. The crude dialkoxy intermediate thus formed can often be used in the next step as such, or can be distilled in vacuo, or recrystallized from a suitable solvent to yield the relatively pure intermediate.

The new compounds of the present invention can readily be prepared, for example, by reacting the intermediate 2,4-dialkoxy-6-halo-1,3,5-triazine, prepared as described above, with an equimolecular or greater quantity of a suitable substituted thiophenol in the presence of an equimolecular or greater quantity of a 2,6-disubstituted pyridine base or an alkali metal hydroxide. 2,4,6-trimethylpyridine is exemplary of a satisfactory 2,6-disubstituted pyridine base, while sodium hydroxide is an example of a suitable alkali metal hydroxide. A base is added to the reaction mixture to neutralize hydrogen chloride formed by the reaction.

The substituted thiophenol reactant selected determines the phenylthio substituent of the new compound of this invention. For example, if the desired compound is 2-(2-chlorophenylthio)-4,6-dimethoxy-1,3,5-triazine, which is represented by the above structural formula wherein R and R' are methyl, $n$ is 1 and X is chlorine, the substituted thiophenol reactant selected for reaction with the corresponding intermediate is 2-chlorothiophenol. Similarly, to prepare a 2-(2,4-dimethylphenylthio)-4,6-dialkoxy-1,3,5-triazine compound, m-4-thioxylenol is selected as the substituted thiophenol reactant. Illustrative of other suitable substituted thiophenol reactants are: m-, or p-chlorothiophenol, 2,3,4,6-tetrachlorothiophenol, pentachlorothiophenol, 2,5-dibromothiophenol, o-, m-, or p-thiocresol, 2 - ethoxybenzenethiol, 2 - methylthiobenzenethiol, o-, or p-nitrothiophenol, 2,4-dinitrothiophenol, 3-methoxy-p-toluenethiol, o-acetamidothiophenol, and the like.

The suitable substituted thiophenol reactant often can be commercially obtained, or can readily be prepared by methods common to the art. For example, the substituted thiophenol reactants can be prepared by the reduction of the corresponding sulfonyl chloride with zinc and acetic acid, zinc and sulfuric acid, and the like. Aryl sulfinic acids similarly can be reduced to the corresponding substituted thiophenol. Aryl sulfonamides can be reduced to the corresponding thiophenols by heating with concentrated hydriodic acid and phosphonium iodide. Also the substituted thiophenol reactants can be readily prepared from the corresponding phenol by the action of phosphorus pentasulfide thereon.

The reaction of the substituted thiophenol reactant with the dialkoxy-monohalotriazine intermediate can be readily carried out by preferably dissolving the intermediate in an inert organic solvent, such as acetone, and mixing the intermediate with the substituted thiophenol reactant, preferably dissolved in the same or similar inert organic solvent or water. Reaction occurs when the base is added, with gentle heating or cooling if required. Generally, the reaction proceeds readily at temperatures at or above the temperatures required for the replacement of the second halogen atom. A steam bath is conveniently utilized to effect this reaction. The crude product formed by the reaction is separated from the by-product salt by filtration, and crystallized from solution by distilling off the solvent and cooling the concentrated solution. The crude product thus obtained can often be used as such, or can be recrystallized from a suitable solvent to yield the relatively pure compound.

The compounds of the present invention represented by the above structural formula wherein $n$ is a number from 1 to 5, and each X is independently selected from the group consisting of chlorine, bromine, nitro, and alkyl, alkoxy, thioalkyl and alkylamidothio radicals of 1 to 4 carbon atoms, provided that when $n$ is a minimum of 3, a maximum of two X's are selected from the group consisting of nitro, amino, and alkyl, alkoxy, alkylthio and alkylamido radicals of 1-4 carbon atoms, can be readily prepared by the aforementioned procedure. Compounds of the present invention wherein $n$ is at least 1 and wherein at least one X is amino are preferably prepared from the corresponding compound wherein the said X is a nitro radical. It has been found more convenient to reduce the compound containing the nitro-radical by means common to the art to an amino radical, than to attempt to utilize an amino-substituted thiophenol reactant in the previously described preparation. The reduction of the nitro radical to an amino radical can be conveniently carried out by nascent hydrogen supplied by the action of tin on hydrochloric acid in the manner common to the art.

The compounds of the present invention having the previously described structural formula, and which are prepared by the procedure described above, are exemplified by 2-(2-chlorophenylthio)-4,6-dimethoxy-1,3,5-triazine,
2-(2-chlorophenylthio)-4-ethoxy-6-methoxy-1,3,5-triazine,
2-(2,5-dichlorophenylthio)-4,6-dimethoxy-1,3,5-triazine,
2-(4-nitrophenylthio)-4-iso-butoxy-6-methoxy-1,3,5-triazine,
2-(2,4-diaminophenylthio)-4,6-dimethoxy-1,3,5-triazine,
2-(3-methylphenylthio)-4-iso-propoxy-6-ethoxy-1,3,5-triazine,
2-(2,4-dimethylphenylthio)-4,6-dimethoxy-1,3,5-triazine,
2-(2,4,5-trichlorophenylthio)-4-sec-butoxy-6-methoxy-1,3,5-triazine,
2-(pentachlorophenylthio)-4,6-dimethoxy-1,3,5-triazine,
2-(3-amino-4-methylphenylthio)-4-methoxy-6-ethoxy-1,3,5-triazine,
2-(2,4-dimethylthiophenylthio)-4,6-dimethoxy-1,3,5-triazine,
2-(2,4-diacetamidophenylthio)-4-methoxy-6-ethoxy,1,3,5-triazine,
2-(2-methyl-4-nitrophenylthio)-4,6-dimethoxy-1,3,5-triazine,
2-(3-methyl-4-methoxyphenylthio)-4,6-dimethoxy-1,3,5-triazine,
2-(3-methyl-4-methylthiophenylthio)-4-methoxy-6-ethoxy-1,3,5-triazine,
2-(3-methyl-4-chlorophenylthio)-4,6-dimethoxy-1,3,5-triazine,
2-(2,4-dibromo-5-methylphenylthio)-4,6-dimethoxy-1,3,5-triazine,
2-(2,4-dichloro-5-ethylphenylthio)-4,6-dimethoxy-1,3,5-triazine,
2-(2-methyl-4-acetamidophenylthio)-4-methoxy-6-ethoxy-1,3,5-triazine, and the like.

The manner in which the new compounds of this invention can be prepared is illustrated in the following examples.

EXAMPLE 1

*Preparation of 2-methoxy-4,6-dichloro-1,3,5-triazine*

A solution of cyanuric chloride (185 g.; 1 mol) in methyl alcohol (1.2 liters) was placed into a 2-liter three-necked, round-bottom flask equipped with mechanical stirrer, thermometer, and ice water cooling bath. 2,4,6-trimethylpyridine (121.2 g.; 1 mol) was slowly added to the flask, while the contents of the flask were stirred. Although the reaction temperature initially rose to 35° C., it was thereafter maintained at 5°–10° C. The mixture was stirred for 2½ hours. The reaction solution was then diluted with water (3 liters) and the resulting yellow crystals of 2-methoxy-4,6-dichloro-1,3,5-triazine were separated therefrom by filtration, washed with water and dried by standing.

The intermediate 2-methoxy-4,6-dibromo-1,3,5-triazine is readily prepared by substituting cyanuric bromide for cyanuric chloride in the above example. Other 2-alkoxy-4,6-dihalo-1,3,5-triazines can readily be prepared by reacting a previously described alkanol reactant with cyanuric chloride or cyanuric bromide, as required, in a manner similar to Example 1, although in many cases it is preferable to utilize an inert orgnaic solvent, such as dioxane, rather than a large excess of the alkanol reactant.

EXAMPLE 2

*Preparation of 2,4-dimethoxy-6-chloro-1,3,5-triazine*

Sodium bicarbonate (168 g.; 2 moles) and then cyanuric chloride (185 g.; 1 mole) were added to methyl alcohol (1000 ml.) and water (100 ml.) in a 2-liter three-necked round-bottom flask equipped with mechanical stirrer, thermometer, and heating mantle. The mixture was stirred for ½ hour at 35° C. and then heated to reflux for ½ hour. The evolution of carbon dioxide gas from the reaction diminished as the reaction neared completion. The reaction mixture was poured onto ice (about 100 g.) and filtered, and the solids were washed with water (1.5 liters), filtered with suction, and dried over sulfuric acid in a vacuum desiccator. The dried solid was dissolved in hot benzene and filtered, and the filtrate diluted with heptane and cooled to 20° F. to precipitate 2,4-dimethoxy-6-chloro-1,3,5-triazine.

EXAMPLE 3

*Preparation of 2-methoxy-4-ethoxy-6-chloro-1,3,5-triazine*

Sodium carbonate (84 g.; 1 mol) and 2-methoxy-4,6-dichloro-1,3,5-triazine (180 g.; 1 mol) prepared in Example 1, are added to ethyl alcohol (800 ml.) and water (100 ml.) and treated as described in Example 2 to yield 2-methoxy-4-ethoxy-6-chloro-1,3,5-triazine.

The intermediate 2-methoxy-4-ethoxy-6-bromo-1,3,5-triazine can be readily prepared by substituting 2-methoxy-4,6-dibromo-1,3,5-triazine for 2-methoxy-4,6-dichloro-1,3,5-triazine in the above example. Other 2,4-dialkoxy-6-halo-1,3,5-triazine intermediates can be prepared by substituting the other suitable alkanols for methanol and/or ethanol in the previous examples.

EXAMPLE 4

*Preparation of 2-(4-acetamidophenylthio)-4,6-dimethoxy-1,3,5-triazine*

A cooled solution of 4-acetamidothiophenol (13.4 g.; 0.08 mol) and 2,4-dimethoxy-6-chloro-1,3,5-triazine (15 g.; 0.08 mol), prepared as described in Example 2, in acetone (100 ml.) are placed into a 500 ml., three-necked, round-bottom flask fitted with a mechanical stirrer, dropping funnel, nitrogen inlet tube, and ice-water cooling bath. 2,4,6-trimethylpyridine (9.7 g.) in acetone (50 ml.) is added dropwise to the flask from the dropping funnel, while the mixture is stirred under a nitrogen atmosphere. After the addition is complete, the reaction mixture is warmed to room temperature and stirring continued for 1.5 hours. The acetone is evaporated from the solution, and the residue dissolved in acetone and precipitated by addition of water. The precipitate of 2-(4-acetamidophenylthio)-4,6-dimethoxy-1,3,5-triazine can be used as such or can be purified, for example by recrystallization from a suitable solvent.

EXAMPLE 5

*Preparation of 2-(2-chlorophenylthio)-4-ethoxy-6-methoxy-1,3,5-triazine*

A solution of 2-ethoxy-4-methoxy-6-chloro-1,3,5-triazine (57 g.; 0.3 mol), prepared as described in Example 3, dissolved in acetone is placed into a 500 ml., three-necked, round-bottom flask equipped with a mechanical stirrer and reflux condenser, o-chlorothiophenol (43.2 g.; 0.3 mol) mixed with a small quantity of acetone is added to the flask. 2,4,6-trimethylpyridine (36.4 g.; 0.3 mol) is slowly added to the flask which is then heated at reflux. The by-product salt precipitate is removed from the mixture by filtration, and the filtrate heated in vacuo on a steam bath to remove acetone and cooled to release the crude product which can be used as such or can be purified by recrystallization from a suitable solvent, such as benzene-heptane mixture.

EXAMPLE 6

*Preparation of 2-(2-methyl-5-iso-propylphenylthio)-4-n-butoxy-6-methoxy-1,3,5-triazine*

A solution of 2-n-butoxy-4-methoxy-6-chloro-1,3,5-triazine (65 g.; 0.3 mol), prepared by the reaction of cyanuric chloride with n-butyl alcohol and then methyl alcohol by the procedure of Examples 1 and 3 dissolved in acetone is reacted with thiocarvacrol (50 g.; 0.3 mol) in the presence of 2,4,6-trimethylpyridine by the procedure of Example 4. The reaction mixture was treated in the manner described therein to yield the product 2(2-methyl-5-isopropylphenylthio)-4-n-butoxy-6-methoxy-1,3,5-triazine as a crystalline solid product.

Other compounds within the scope of the present invention having the aforesaid structural formula can be prepared in the manner detailed in the previous examples. Given in Examples 7–19 are the reactants which can be used with cyanuric chloride and cyanuric bromide to prepare the indicated named compounds of this invention. In these examples, cyanuric chloride is designated for brevity as CC. It should also be noted that cyanuric bromide can be utilized in place of cyanuric chloride.

EXAMPLE 7

CC+iso-propyl alcohol+2,4-dinitrothiophenol+methyl alcohol=2 - (2,4-dinitrophenylthio) - 4 - isopropoxy - 6-methoxy-1,3,5-triazine.

EXAMPLE 8

CC+sec - butyl alcohol+4-bromothiophenol+ethyl alcohol=2-(4-bromophenylthio)-4-sec - butoxy-6-ethoxy-1,3,5-triazine.

EXAMPLE 9

CC+methyl alcohol+2,4-dimethoxythiophenol=2-(2-4-dimethoxyphenylthio)-4,6-dimethoxy-1,3,5-triazine.

EXAMPLE 10

CC+n-propyl alcohol+3-methoxy - p - toluenethiol+methyl alcohol=2-(2-methoxy-4-methylphenylthio)-4-n-propoxy-6-methoxy-1,3,5-triazine.

EXAMPLE 11

CC+methyl alcohol+2-methylthiobenzenethiol=2-(2-methylthiophenylthio)-4,6-dimethoxy-1,3,5-triazine.

EXAMPLE 12

CC+methyl alcohol+2,3,4,6-tetrachlorothiophenol=2-(2,3,4,6 - tetrachlorophenylthio) - 4,6 - dimethoxy - 1,3,5-triazine.

EXAMPLE 13

CC+methyl alcohol+2-nitrothiophenol=2 - (2 - nitrophenylthio)-4,6-dimethoxy-1,3,5-triazine.

EXAMPLE 14

CC+methyl alcohol+pentachlorothiophenol=2-pentachlorophenylthio-4,6-dimethoxy-1,3,5-triazine.

EXAMPLE 15

CC+methyl alcohol+2,4-dibromothiophenol=2-(2,4-dibromophenylthio)-4,6-dimethoxy-1,3,5-triazine.

EXAMPLE 16

CC+methyl alcohol+2,4,5-trichlorothiophenol=2-(2,4,5-trichlorophenylthio)-4,6-dimethoxy-1,3,5-triazine.

EXAMPLE 17

CC+methyl alcohol+2,4,5-tribromothiophenol=2-(2,4,5-tribromophenylthio)-4,6-dimethoxy-1,3,5-triazine.

EXAMPLE 18

CC+methyl alcohol+2,3,4,5-tetrabromothiophenol=2-(2,3,4,5-tetrabromophenylthio) - 4,6 - dimethoxy - 1,3,5-triazine.

EXAMPLE 19

CC+methyl alcohol+pentabromothiophenol=2-pentabromophenylthio-4,6-dimethoxy-1,3,5-triazine.

The following example is illustrative of the preparation of the compounds of the present invention wherein $n$ is at least 1 and at least one X is an amino radical. Although a specific 2-(nitrophenylthio)-4,6-dialkoxy-1,3,5-triazine is utilized in the example, it should be noted that any other compound of this invention wherein $n$ is at least 1 and at least one X is a nitro radical may be substituted in its place to obtain the corresponding amino-substituted compound.

EXAMPLE 20

*Preparation of 2-(2-aminophenylthio)-4,6-dimethoxy-1,3,5-triazine*

An excess of iron filings is slowly added to the product of Example 13 (40 g.) suspended in hot water (400 ml.) acidified with concentrated hydrochloric acid (5 ml.). The mixture is shaken continually during the addition and cold water is added to the mixture as needed to moderate the reaction temperature. When heat no longer evolves, the mixture is gently heated and sodium carbonate (10 g.) is added. The mixture is filtered while hot and the filtrate cooled and extracted with anhydrous diethyl ether. The ether extract is dried over anhydrous magnesium sulfate, which is then removed by filtration. The ether is removed by distillation in vacuo on a steam bath to yield the desired product as the residue.

For practical use as insecticides, the compounds of this invention are generally incorporated into insecticidal compositions which comprise an inert carrier and an insecticidally toxic amount of such a compound. Such insecticidal compositions, which are usually known in the art as formulations, enable the active compound to be applied conveniently to the site of the insect infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 21

*Preparation of a dust*

Product of Example 4 _____ 10
Powdered talc _____ 90

The above ingredients are mixed in a mechanical grinder-blender and are ground until a homogeneous, free-flowing dust of a desired particle size is obtained. This dust is suitable for direct application to the site of the insect infestation.

The insecticides of this invention can be applied in any manner recognized by the art. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the coddling moth, cotton-boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the wooly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The utility of the compounds of this invention was illustrated for example, by experiments carried out for the systemic control of pea aphids.

In a typical experiment, samples of the compound to be tested were each dissolved in a solution of acetone (0.5 ml.) and alkyl aryl polyether alcohol type surface active agent (0.5 ml.) and dispersed in distilled water to a concentration of 0.1% by weight test compound per volume of solution. The test solution is then applied (20 ml. per application) to the vermiculite substratum of potted pea plants. Forty-eight hours after application the plants are each infested with ten adult pea aphids and mortality of any nymphal colony determination is made after five days as compared to untreated control infestations.

The results of these experiments demonstate the high degree of pesticidal activity possessed by the compounds of the present invention.

We claim:

1. A compound of the formula:

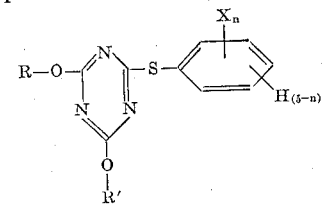

wherein R and R′ are independently selected from the group consisting of alkyl radicals of 1 to 4 carbon atoms; $n$ is a number from 1 to 5; and each X is independently selected from the group consisting of chlorine, bromine, nitro, amino, and alkyl, alkoxy, alkylthio and alkylamido radical of 1 to 4 carbon atoms, provided that at least one X is selected from the group consisting of chlorine, bromine, nitro, amino, and alkoxy, alkylthio and alkylamido radicals of 1 to 4 carbon atoms, and provided that when $n$ is a minimum of 3, a maximum of two X's are selected from the group consisting of nitro, amino and alkyl, alkoxy, alkylthio and alkylamido radicals of 1 to 4 carbon atoms.

2. A compound of claim 1 wherein X is chlorine.
3. A compound of claim 1 wherein X is an amino radical.
4. A compound of claim 1 wherein X is an alkylamido radical of 1 to 4 carbon atoms.
5. 2 - (2 - chlorophenylthio) - 4,6 - dimethoxy - 1,3,5-triazine.
6. 2 - (2,5 - dichlorophenylthio) - 4 - methoxy - 6-ethoxy-1,3,5-triazine.
7. 2 - (2,4,5 - trichlorophenylthio) - 4,6 - dimethoxy-1,3,5-triazine.
8. 2 - (2,3,4,6 - tetrachlorophenylthio) - 4,6-dimethoxy-1,3,5-triazine.
9. 2 - (pentachlorophenylthio) - 4,6 - dimethoxy - 1,3,5-triazine.
10. 2 - (2 - nitrophenylthio) - 4,6 - dimethoxy - 1,3,5-triazine.
11. 2 - (4 - aminophenylthio) - 4,6 - dimethoxy - 1,3,5-triazine.
12. 2 - (4 - acetamidophenylthio) - 4,6 - dimethoxy-1,3,5-triazine.

References Cited by the Examiner

UNITED STATES PATENTS 3,155,487  11/1964  Fancher et al. _____ 260—248
3,156,690  11/1964  Dexter et al. _____ 260—248

WALTER A. MODANCE, *Primary Examiner.*

J. M. FORD, *Assistant Examiner.*